United States Patent [19]

Sappenfield

[11] 3,999,339
[45] Dec. 28, 1976

[54] METHODS AND MEANS FOR SECURING DOOR FRAMES IN OPENINGS THEREFOR

[76] Inventor: George L. Sappenfield, 5331 Maple Drive, Mission, Kans. 66204

[22] Filed: June 23, 1975

[21] Appl. No.: 589,376

[52] U.S. Cl. .................. 52/98; 52/210; 52/213; 52/214; 52/717; 52/741; 85/72
[51] Int. Cl.² .......................... E06B 1/60
[58] Field of Search ............ 52/98, 100, 213–217, 52/204, 206, 210, 741, 717; 49/504; 85/72, 73, 74

[56] References Cited

UNITED STATES PATENTS

| | | | |
|---|---|---|---|
| 1,451,012 | 4/1923 | Ellison | 52/217 X |
| 2,282,711 | 5/1942 | Eklund | 85/73 X |
| 2,309,452 | 1/1943 | Hasenburger et al. | 49/504 |
| 2,595,506 | 5/1952 | Backman | 52/217 X |
| 2,743,795 | 5/1956 | Taubman | 52/217 |
| 3,078,002 | 2/1963 | Rodgers, Jr. | 85/73 X |
| 3,448,651 | 6/1969 | Passer | 85/72 |
| 3,469,350 | 9/1969 | Lange | 49/504 |
| 3,546,998 | 12/1970 | Lerich | 85/72 |
| 3,599,381 | 8/1971 | Gartner | 52/217 |

FOREIGN PATENTS OR APPLICATIONS

| | | | |
|---|---|---|---|
| 1,805,629 | 9/1969 | Germany | 52/217 |
| 6,404,171 | 10/1965 | Netherlands | 49/504 |
| 6,802,514 | 8/1969 | Netherlands | 52/217 |
| 469,175 | 4/1969 | Switzerland | 49/504 |

*Primary Examiner*—Price C. Faw, Jr.
*Assistant Examiner*—Leslie Braun
*Attorney, Agent, or Firm*—Thomas M. Scofield

[57] ABSTRACT

Improved means for and methods of removably fastening door frames into door openings where the door opening is defined by masonry construction, concrete columns and the like (not wood).

16 Claims, 8 Drawing Figures

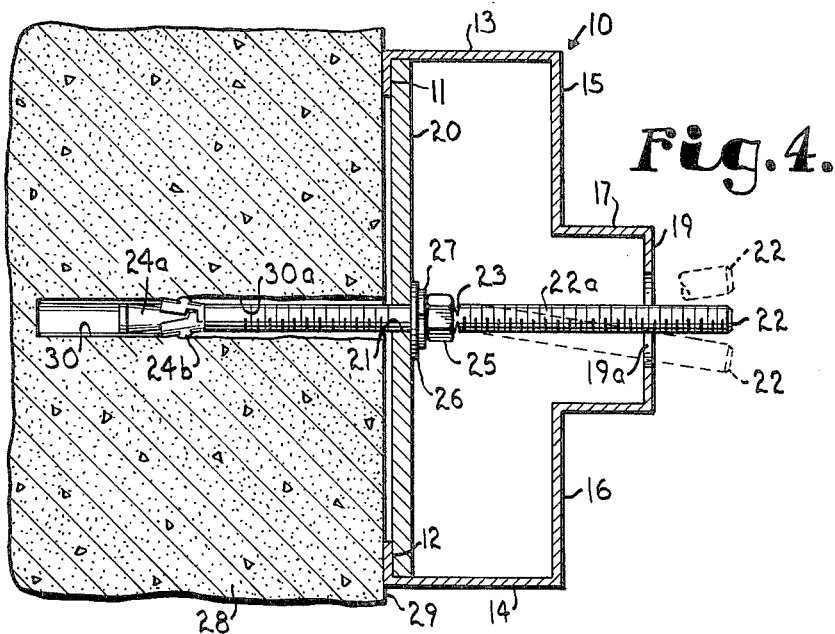
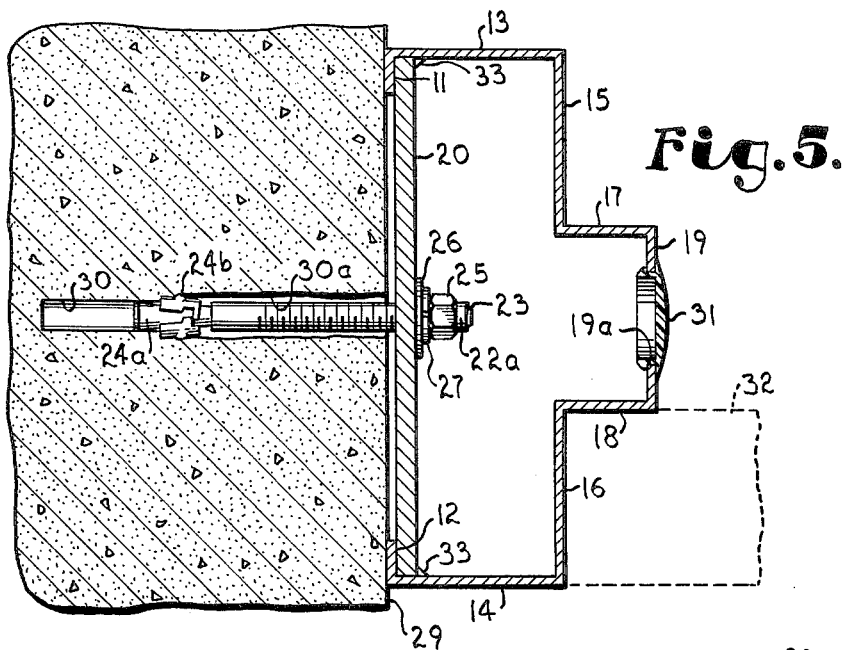
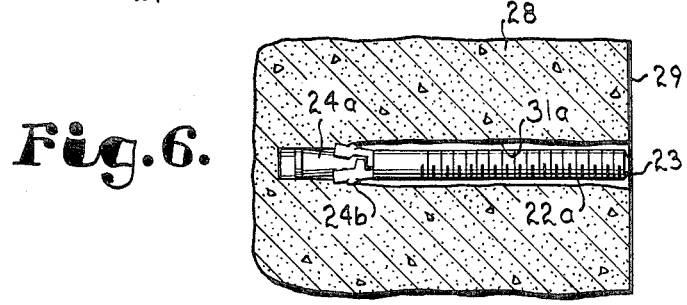

METHODS AND MEANS FOR SECURING DOOR FRAMES IN OPENINGS THEREFOR

BACKGROUND OF THE INVENTION

The instant improvement is directed to new methods of removably attaching door frames to masonry construction openings or to openings between concrete columns. The masonry work or columns into which or between which the door frame is to be inserted may be already in situ or in process of construction. The instant improvement does not have anything to do with application of door frames into wood framing or woodwork, which is entirely a different problem.

Referring to the prior art, generally speaking, during the construction of a building, the door frames are built in with the masonry work or concrete work. Thus, for example, in masonry work, as the walls defining the door openings are built up from the floor, the door frames are laid into the opening (three sides and a floor kick plate) and the door frames are filled with cement as the masonry work rises, with connecting T-members laid into the door frame and into the masonry work. Thus, when the wall course has risen to full height, the door frame is filled with cement, a plurality of T-anchors in place, cross members of the Ts engaging the flanges of the door frame lying against the masonry work, the bars of the Ts embedded in the masonry.

The latter construction causes problems in that, self-evidently, door frames, once installed, cannot be taken out without destroying the masonry work or column right next thereto, because of the structural T-members embedded therein and gripping the door frame, which is itself filled with cement. Additionally, if the masonry work or column is already present, such system will not work. In such case, holes must be drilled in the existing masonry work and bolts anchored thereinto through the center section of the conventional door frame.

The conventional methods of attaching door frames to already existing masonry construction openings or openings between concrete columns typically involve the use of a long screw or bolt applied through the center of the door stop of the frame, such screw or bolt associated with appropriate means operative to receive the screw therewithin applied into the wall. For example, spaced holes are drilled into the existing masonry or column wall and conventional lead lined plugs are set therein to receive the screw. In the use of such elongate screw members, there is an alignment problem of the screw with respect to the plug. If the screw goes off line in application, then there arises a problem of frame alignment in the door opening. Still further, the screw head may, once applied into the wall, be off line, requiring grinding and filling. These conventional methods and applications utilizing elongate screws reaching from the door stop of the frame into the wall additionally may be deficient is strength as the frame must carry the weight of the door in use, receive impacts of the door closing and opening, and the like.

The instant improved method and apparatus, when used in applying door frames into newly constructed masonry work or columns differs in application in that the door frames are applied after the masonry work or columns are actually completed. The method of application and the means used therein are identical in the mounting of door frames to long existent masonry work or concrete columns or the same just completed.

OBJECTS OF THE INVENTION

A first object of the instant invention is to provide new and improved means for and methods of applying and mounting door frames of conventional construction to masonry construction openings or openings between concrete columns, which means and methods are exceedingly simple, cheap, readily and easily employed and further serve to effectively and quickly mount the door frames in the particular openings selected to receive the doors.

Another object of the invention is to provide such new methods of and means for removably mounting door frames in masonry construction openings or openings between concrete columns, which means not only may optionally serve as permanent securement for the door frames, but also permit their removal therefrom, quickly, simply and easily, without any damage occuring to either the door frames themselves or the masonry construction or concrete columns in which they were mounted.

Another object of the invention is to provide novel means for and methods of readily mounting conventional door frames in masonry construction openings or between concrete columns, which masonry work or columns are in the process of construction, the frames being applied and secured in place after the completion of the masonry work or columns, whereby the frames do not require filling with concrete or use of the conventional securements which require destruction of the adjacent masonry or columns when the door frames are removed therefrom.

Another object of the invention is to provide such novel attachment means and methods which may be employed with more complex door frames, such as those incorporating a window frame.

Another object of the invention is to provide such means for and methods of removably attaching door frames to masonry construction openings or openings between concrete columns which do not employ elongate screws communicating between the door stop on the door frame and the masonry wall or concrete column. In this manner, and with the improved means, the strength of the connection is provided right at the abutment of the door frame with the wall. Additionally, all alignment problems of the conventional mounting means and methods are avoided, including any problems of screw alignment, frame alignment and the like.

Other and further objects of the invention will appear in the course of the following description thereof.

In the drawings, which form a part of the instant specification and are to be read in conjunction therewith, an embodiment of the instant invention is shown. In the various views, like numerals are employed to indicate like parts.

The various figures of the drawings show, in sequence, the method of attaching a conventional door frame into a door opening surrounded by masonry construction work or concrete columns. The figures show the stages of applications, in sequence, and, finally, removal of the frame from the opening.

FIG. 4 is a view like that of FIGS. 2 and 3 but showing the next stage wherein the outer end of the bolt is snapped off.

FIG. 5 is a view like and subsequent to FIG. 4 wherein the nut has been tightened down on the bolt to fix same in the wall and a cap has been provided over the door frame opening.

FIG. 6 is a horizontal section through the masonry or column wall next to the door frame showing the bolt driven into the wall and the frame removed therefrom.

DESCRIPTION OF STRUCTURE AND FUNCTION

Figure 1:
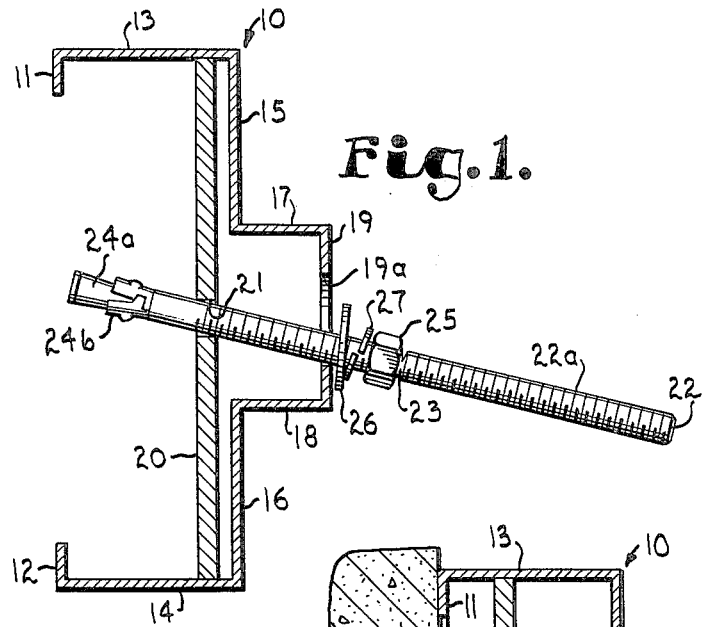
FIG. 1 is a horizontal section through one vertical side of a conventional door frame with the means for mounting and securing the frame in the door opening initially positioned within the frame in the manner employed as the frame is lifted into position in the door opening.

Ninety percent of the door frames employed or applied into openings to carry doors thereon are three sided (two vertical sides and a top). The balance may have a fourth horizontal floor member such as a kickplate. Welded door frames come to the job with the members already secured in final position. In the others, the frame is assembled from the three parts before it goes into the opening. One side of the frame has hinge slots, typically, the other the catch, depending on the direction in which the door opens.

Turning to the figures, the conventional door frame is shown and described only in horizontal section through one of the vertical sides. The views employed would be identical for the top side, however, as the section through the frame is identical there and the means and method of application of the top of the frame to the top of the door opening are identical.

The integral frame section includes the following described structure. First, a pair of elongate flanges 11 and 12 are provided which are opposed to and running parallel to one another. These flanges normally lie against the wall surface (masonry or concrete column typically) into which the door frame is mounted. Flanges 11 and 12 have, fixed to the outer side edges thereof, inwardly (with respect to the door opening) extending panels 13 and 14. Connected to the inboard edges of parallel panels 13 and 14 and extending at substantial right angles thereto are door carrying or receiving webs 15 and 16 which extend parallel to one another, in opposition to one another. In the center of the door frame member, which is generally designated 10, there is provided a door stop member made up of stop panels or strips 17 and 18 fixed, respectively, to the inward edges of webs 15 and 16 and extending at right angles thereto. Finally, there is an innermost closure wall member 19.

There has just been described a conventional door frame member which is typically one of three which, when assembled in an inverted U-shaped construction, is inserted into a door opening and fastened thereto in order to receive a conventional door. Thus, looking at FIG. 5, which shows a door frame of the described construction mounted on the wall of a door opening, there will be provided, directly opposite to the door frame seen in FIG. 5 (assuming it is one of the vertical two frames) a like, opposed frame. The door will be mounted so as abut, in closed position, either webs and strips 15 and 17 or same 16 and 18, depending on how the door is mounted and in which direction it opens. Accordingly, either web 15 or web 16 will receive the hinges for the door or the catch therefor (not seen).

Figure 8:
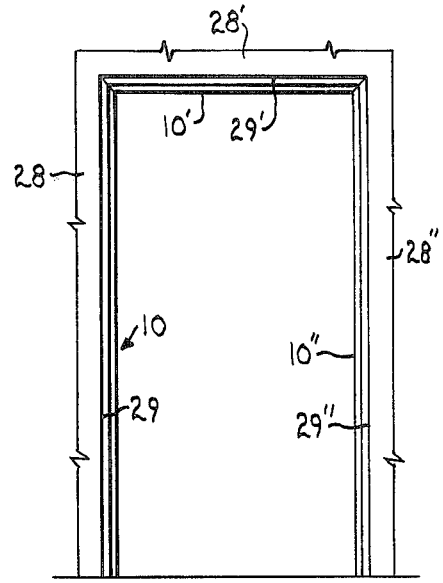
FIG. 8 is a front perspective of a wall door opening with three frame elements mounted therein.

FIG. 8 shows a door opening having three frames precisely like frame 10 (10, 10' and 10'') fixed to one another and mounted in the opening ready to receive a door thereon.

The instant improvement is directed to means for and methods of mounting conventional door frames of the typical structure described on the wall surfaces of a door opening. The walls defining the door opening may be just constructed or long in place. They may be masonry, concrete columns or any other construction material, excluding wood. It is not necessary to have a top frame member (like 10' in FIG. 8) but, if same is employed, the subject means and method may be employed to mount that overhead horizontal frame member in the door opening, as well as the vertical frame members.

While the instant improvement of structure and method may be employed with door frames of varied dimension, in order to make a specific example disclosure, typical dimensions of a conventional door frame are as follows. The width of the entire frame (from the outer face of panel 13 to the outer face of panel 14) is 5⅝ inches. The total depth of the frame member (from the outer faces of flanges 12 and 11 to the outer face of wall closure 19) is 2⅜ inches. The depth of panels 13 and 14 (from the outer faces of flanges 11 and 12 to the outer faces of webs 15 and 16) is typcially 1⅞ inches leaving the depth of strips 17 and 18 as ½ inch.

These dimensions given, then, for purposes of description of the apparatus used in door opening mounting of such a frame, the total length of the expansion bolt (before breaking off of the outer portion thereof) to be described would be 5¾ inches. The length of the portion of the bolt which is left after breaking off the outer part thereof would be 2¾ inches, thus the outer removed portion of the bolt in this specific example would be substantially 3 inches. The depth of the threading of the portion of the bolt left after break-off is necessarily sufficient to carry the nut and set the expansion means to be described.

The wall frame and bolt shown in the drawings are not precisely configured according to the just recited dimensions. Specifically, the bolt illustrated is a little longer than necessary.

The necessary elements for use of the approved method are at least three in number. These comprise a perforated plate (generally designated 20) having an opening 21 centrally therethrough, an elongate bolt (generally designated 22) having a weakened portion 23 intermediate the ends thereof and expansion setting means (generally designated 24) at one end thereof and, finally, nut 25 which is threaded on the externally threaded portion 22a of bolt 22. Additionally, there is most preferably provided the further elements comprising a washer 26 and a lock washer 27 associated with nut 25.

Figure 7:
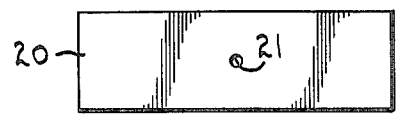
FIG. 7 is a front view of the plate employed in the system.

Looking at the specific construction of these elements in a little more detail, the total length of bolt 22 is preferably at least twice the total depth of the frame member (in the specific example 5¾ inches length bolt before severance used with a 2⅜ inches deep frame). The weakened severance zone 23 is preferably positioned substantially intermediate the ends of the bolt (in the specific example noted, 3 inches from the non-expanding end). The threaded zone 22a extends from the non-expanding end (in order that the nut may be threaded onto the bolt) past the weakened zone 23 at least a distance greater than the depth of the nut 25. The plate 20, as seen in FIG. 7, is preferably rectangular and of a width such that plate 20 slidingly fits between the inner faces of panels 13 and 14 and is adapted to overlie, in full contact with their inboard (of the door opening) faces, flanges 11 and 12. The height of plate 20 is preferably, but not necessarily less than the distance between the outboard faces of panels 15 and 16 and the inboard faces of flanges 11 and 12. In the specific example given, this would be preferably less than 1⅞ inches. The thickness of plate 20 is that necessary to give the sufficient strength and rigidity to lock the door frame in place after application of the apparatus to be described.

On bolt 22 the expansion means 24 at the one end thereof typically comprises a tapered shank portion 24a of the bolt, same carrying pivotally engaged arcuate shell portions 24b mounted thereof. This particular expansion engaging means is not new to this disclosure and any conventional expansion bolt structure may be employed in its place, so long as, once the bolt in question has been driven into the wall and the nut tightened down upon the bolt, the shaft in the wall is locked and fixed thereinto. Said otherwise, that expansion means shown is operable in the instant process, effective, readily available commercially and cooperates with and permits the use of the process as further described. The washer 26 is conventional as is the lock washer 27. These elements are not necessary to the use of the instant apparatus or process, but their inclusion in the apparatus assembly is highly preferred and most advantageous.

METHOD OF APPLICATION

Figure 2:
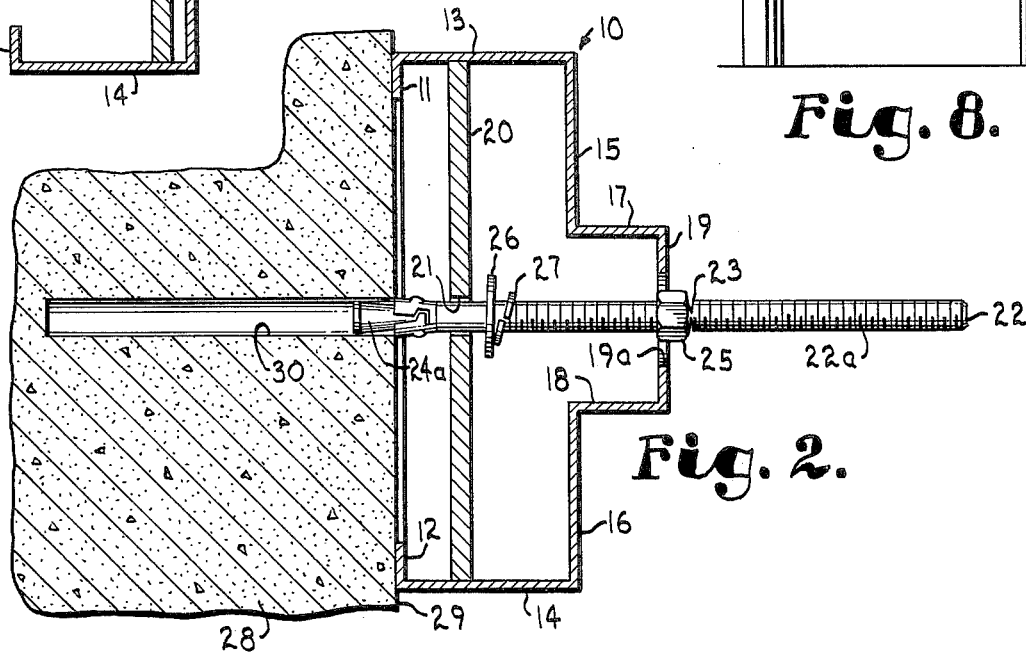
FIG. 2 is a view like that of FIG. 1, but showing the frame next to the door opening in a masonry construction or a concrete column, into which a hole has been drilled. The means for securing the door frame to the door opening structure are shown positioned to start the securement.

FIG. 1 shows the frame section before it is erected into the wall opening in which the door frame is to be mounted. FIG. 2 shows the wall section 28 having inwardly facing door frame receiving surface 29 at one end thereof. In wall section 28 there are drilled a spaced plurality of passages, holes or openings 30 which are of slightly greater internal diameter, but only slightly, than the outer diameter of bolt 22. Openings or passages 30 are of lesser internal diameter than the outside diameter of the expansion means 24b. In the specific example of door frame and bolt previously defined with respect to dimension, a passage is provided some 3½ inches deep. This gives an excess of ¾ inch in depth over the remaining leg of the bolt after break-off of the outer portion thereof (to be described). Thus, the spaced passages or openings 30 are of slightly greater depth than the length of the bolt from the outboard (expansion) end thereof to the weakened portion 23 thereof. The passages 30 are drilled or otherwise provided in the wall sections next to the door openings at the desired or specified intervals which, typically, in a door frame of conventional dimensions are 3 feet apart.

Referring to standard door frames, typically, from one vertical wall face 29 to the other 29' (FIG. 8) is 40 inches. From the floor to the top of the door opening is either, typically, 7 feet 2 inches or 7 feet 4 inches. In the door frame for a 7 feet 2 inches height opening, all frame elements have the same cross-sectional configuration. For the 7 feet 4 inches height door opening, the horizontal head frame has base walls 13 and 14 thereof 2 inches greater in depth than walls 13 and 14 in the vertical frame sections. Typical doors are 36 inches in width.

The number of bolts 22 employed in each vertical door frame member 10 or 10'' (FIG. 8) is preferably at least three (which is analogous to the number of T anchors conventionally employed in like frame members). The lowest such bolt 22 would typically be spaced 4 inches off the floor, while the uppermost would be 8 inches from the wall 29' (FIG. 8). The intermediate bolt would be equally spaced therebetween. If additional bolts are desired or required, same may be employed. Optionally, in the top frame member, one or two may be employed. However, they are not required.

There are provided, either initially or by drilling once the desired spacing of the support bolts is selected, a like and matching plurality of openings 19a in the outer wall or member 19. These openings must be of a size at least slightly greater than the size of washer 26 if same is employed, lock washer 27 if only lock washer is employed or larger than the outer diameter of nut 25 if neither washer 26 nor lock washer 27 is employed. Even in the latter case, the openings 19a are preferably of greater size than the size of nuts 25 in order that suitable means (such as an elongate socket wrench) may be inserted into the openings 19a for purposes to be described. Under certain circumstances, the plates 20 may be welded to the frame, once the door frame attachment is accomplished, and in such case, again, ample opening size at 19a will be required to carry out such operation therethrough.

At any rate, with the openings 30 provided in the walls 28, 28' and 28'' spaced at suitable intervals and like spaced, matching openings 19a provided in the innermost panels 19 of the door stop portion of the frame elements, the attachment method and process is ready to begin. Before the three-sided door frame is erected into position in the door opening, at each opening 19a (or selected ones thereof), there is provided an assemblage of elements, comprising the bolt 22, plate 20, nut 25 and most preferably washer 26 and lock washer 27. This assemblage is mounted in the frame as seen in FIG. 1, specifically, with plate 20 inserted into the space between flanges 11 and 12 and panels 15 and 16, engaged by the outboard portion of the bolt with nut 25 threaded onto the bolt at least just past the weakened portion 23 and with washer 26, lock washer 27 and nut 25 positioned inboard (to the right in FIG. 1) of panel 19.

The plate-bolt and attachment means assemblies so positioned, the three-sided door frame may then be erected into the door opening so that each bolt can register with each passage 30 as seen in FIG. 2, wherein the expansion portion of the bolt has been inserted into the beginning of the passage for driving of the bolt thereinto. This positioning is done individually with each bolt as the worker begins the attachment of the frame to the wall surfaces 29, 29' and 29'' in the door opening. If a single worker is erecting the frame in the door opening, the bolt attachments are made one at a time. If there is more than one worker, then two bolt attachments may be worked on simultaneously, one by each man.

Starting from the position of FIG. 1 with the bolt-plate-attaching means assembly carried by the frame as seen in FIG. 1, the worker then engages the expansion portion of the bolt in passageway 30 with the washers 26 and 27 positioned inboard of the frame and the nut 25 essentially positioned in opening 19a. Using a suitable hammer or drive means, the worker then forces the bolt into opening or passage 30 to the position seen in FIG. 3, namely, with the plate 20 driven against the inboard (into the door opening) faces of flanges 11 and 12, in effect pinning the outboard faces of flanges 11 and 12 against the surface 29 of wall 28. Washer 26, lock washer 27 and nut 25 are in driven engagement against the inboard side of plate 20. As may be seen, at this point, due to the overall length of the bolt (which, as noted, is substantially twice the depth of the frame 10), the inboard threaded portion of the bolt to the right (in the view of FIG. 3) of the weakened portion 23 extends outwardly of member 19 and through opening 19a.

Figure 3:
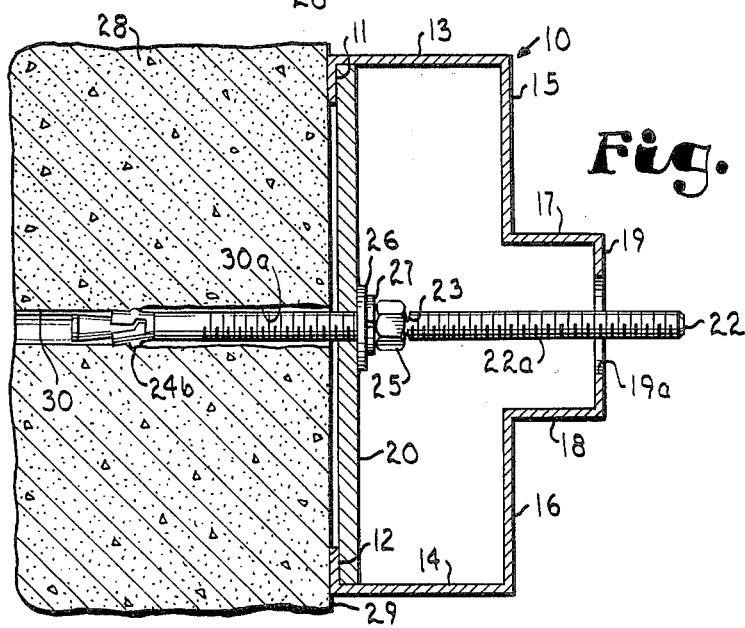
FIG. 3 is a view like that of FIG. 2 (a horizontal section through the door frame and the adjacent masonry or concrete column) showing the bolt driven into the opening in the wall structure to a depth that the retainer plate bears against the door frame flanges, securing them against the wall.

Both FIGS. 3 and 4 clearly show that driving the expansion portion of the bolt and the following portion thereof into opening 30 enlarges the said passage 30 in its portion 30a next the door opening carrying frame 10. Once the initial set position of FIG. 3 is attained, the worker, operating on the righthand end of bolt 22 in the view, moves it back and forth until this portion is snapped off at the weakened zone 23. This is accomplished by gripping it with any suitable conventional gripping tool such as pliers. FIG. 4 illustrates the arcuate motion of the outer portion of the bolt in the snap-off process.

For each given bolt, once the outer end thereof has been removed by breaking same off at the weakened zone 23, there remains the process of setting the expansion elements of the bolt in the wall 28. The removal of the outer end of the bolt makes this action readily possible. Thus, immediate access may be had through the opening 19a to the nut 25 which is threaded on the portion of the bolt outboard of the weakened zone 23. Any suitable conventional socket wrench of sufficient depth may be inserted through opening 19a to engage nut 25 and turn same down upon the remaining threaded portion of the bolt 22, whereby (lefthand portion of FIG. 5) the tapered shank of the expansion portion 24 of the bolt is drawn back through the arcuate shell portions 24b, thus setting them firmly and rigidly into the wall portion of the opening 30. The given bolt and plate are secured thereby and thus one portion of door frame 10 is rigidly fixed to the wall surface 29. At this point a plastic, rubber, or metal seal cap 31 may be snapped into the opening 19a over a set bolt. A door schematically indicated at 32 may be mounted on either side of the stop portion of the door frame. Alternatively, before the cap 31 is inserted, the plate 20 may be welded as at 33, brazed or otherwise fixedly attached to the interior faces of panels 13 and 14.

Finally, if it is desired to remove the door frame from the wall opening and wall surfaces 29, 29' and 29", such operation is very simple. Each cap 31 is removed successively and the nuts 25 backed off of the threaded portions remaining of bolts 22. Washers 26 and lock washers 27 are likewise removed from the end of the bolts. The set portions of the bolts (FIG. 5) are then driven fully into passages or openings 30 until the inboard ends thereof are at least flush with wall surface 29 and preferably a quarter, a third or a half inch therepast. This is accomplished by hammering on a tap inserted through opening 19a in contact with the inboard end of the bolt. Whether or not the plates 20 are welded to the door frame as at 33 is irrelevant for frame removal purposes. All that is required is that the remaining bolt elements have the nuts and washers removed therefrom and that same be driven to the position of FIG. 6 or deeper, whereby to clear the faces of the walls for each given frame. At that point, with all bolts which secured the frame driven into the wall, the frame member may be easily removed from the door opening. Thereafter, the openings containing the bolts may be sealed with any conventional substance to again provide a smooth wall surface.

In the event it is again desired to put a door frame into the same opening, all that is required is that the new passages 30 be spaced away from the existing bolts resident in the walls with a different spacing of openings 19a in the frames to be mounted in the door opening.

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Improvements in a door frame element fastened on one wall surface of a rectangular door opening comprising, in combination, the door frame element fastened in the door opening having a cross-sectional structure comprising:

a pair of spaced apart, opposed, narrow, parallel flanges lying both flush against the wall surface of the door opening into which the element is mounted, a pair of spaced apart, substantially parallel, opposed, inwardly extending (with respect to the door opening) panels, each panel connecting at one edge to one edge of one of said flanges and running substantially normal thereto, a pair of opposed, substantially parallel and spaced apart webs, each web connected at one edge to one edge of one of said panels and extending substantially normal thereto, and a C-section door stop member having its closed face inward of the door opening and one edge of each leg thereof connected to one edge of one of the webs and running substantially normal thereto, and there being a plurality of spaced apart holes in the inward wall of the door stop member along the length thereof, and a plurality of holes drilled into said wall surface which align with the inboard holes in the inward wall of door stop member, the door frame element inserted into place within the door opening so that the outboard flanges thereof rest flush against the said door opening wall surface and the wall and door frame holes are in alignment with one another, a plurality of self-setting, externally threaded, elongate bolt members each driven into one of said wall opening through the respective, aligned door frame element holes, each of said bolts having been originally of a length greater than the depth of the frame element, with a weakened portion intermediate the ends thereof, whereby the inboard portions of the bolts were snapped off after the bolts had been driven into the wall, so that they did not protrude inboard of the frame element thereafter, each said bolt having carried adjacent the outboard end thereof, a rectangular, frame element-outboard flange-engaging plate, as well as a plate-retaining nut threaded on the adjacent, externally threaded portion of the plate, the nut inboard of the plate and outboard of the weakened portion of the bolt, said bolts each having been driven into said door opening wall holes a sufficient depth that the nuts on the bolts contacted the inboard sides of the plates on the bolts, driving the outboard sides of the plates, at the edges thereof, into contact with the frame element flanges, thereby holding them against the said wall surface of the door opening, the inboard end of each of said bolts having thereafter been snapped off and, following this, each nut on each bolt tightened down against the inboard face of each said plate, thereby firmly securing the door frame elements in the door opening against the said wall surface defining part of said door opening.

2. Improvements as in claim 1 wherein the plates are permanently fixed to the door frame element after installation.

3. Improvements as in claim 1 wherein, in order to ensure the ability to remove the door frame element from the wall surface of the door opening, each of the holes in the wall surface receiving the door frame element was originally drilled at least as deep as each bolt is long after the snap off of the inboard portion of the said bolt whereby, after the frame element has been mounted in the door opening on the said wall surface and it is desired to remove same from the door opening, the nuts could be removed from the inboard ends of the bolts and each of the bolts driven into the wall at least so far that the inboard end of each bolt was flush with the wall surface, whereby the frame element could be removed from the wall surface.

4. Improvements as in claim 1 including a washer and a lock washer between the nut on each bolt and the plate on each bolt.

5. Improvements in an integral, three-sided door frame installed on the side and top wall surfaces of a rectangular door opening comprising, in combination, the three elements (two sides and one top) of the door frame fastened in the door opening having a cross-sectional structure comprising:

a pair of spaced apart, opposed, narrow, parallel flanges lying flush against the wall surface of the door opening into which the frame is mounted, a pair of spaced apart, substantially parallel, opposed, inwardly extending (with respect to the door opening) panels, each panel connecting at one edge to one edge of one of such flanges and running substantially normal thereto, a pair of opposed, substantially parallel and spaced apart webs, each web connected at one edge to one edge of one of said panels and extending substantially normal thereto, and a C-section door stop member having its closed face inward of the door opening and one edge of each leg thereof connected to one edge of one of the webs and running substantially normal thereto, there being a plurality of spaced apart holes in the inward wall of the door stop member along the length thereof, and a plurality of holes drilled into the wall surfaces defining the door opening which align with the inboard holes in the inward wall of the door stop member, the said integral three-sided door frame inserted in place within the door opening so that the outboard flanges of the door frame elements rest flush against the said door opening wall surface and the wall and door frame holes are in alignment with one another, a plurality of self-setting, externally threaded, elongate bolt members each driven into one of said wall openings through the respective, aligned, door frame holes, each of said bolts having been originally of a length greater than the depth of the frame elements, there having been a weakened portion of each bolt intermediate the ends thereof, whereby the inboard portions of the bolts were snapped off after the said bolts were driven into the wall, so that they did not protrude inboard of the frame thereafter, each said bolt having carried originally adjacent the outboard end thereof, a rectangular, frame element-outboard flange-engaging plate, as well as a plate-retaining nut threaded on the adjacent, externally threaded portion of the plate, the nut inboard of the plate and outboard of the weakened portion of the bolt, said bolts each having been driven into said door opening wall holes a sufficient depth that the nut on the bolt contacted the inboard side of the plate on the bolt, driving the outboard sides of the plate, at the edges thereof, into contact with the frame element flanges to hold them against the said wall surface of the door opening, the inboard end of each bolt thereafter having been snapped off and, after that, each nut on each bolt tightened down against the inboard face of each said plate, thereby firmly securing the door frame in the door opening against the wall surfaces which define the said door opening.

6. Improvements as in claim 5 wherein the plates have been permanently fixed to the door frame elements.

7. Improvements as in claim 5 wherein, in order to insure the ability to remove the door frame from the door opening, each of the holes in the wall surface defining the door opening was originally drilled at least as deep as each bolt was long after the snap off of the inward portion of the said bolt, whereby, after the frame was mounted in the door opening on the wall surface, if it were desired to remove same from the said door opening, the nuts are removed from the inboard ends of the bolts and each of the bolts is driven into the wall at least so far that the inboard end of each bolt is flush with the wall surface, whereby to permit the removal of the frame from the wall surface of the door opening.

8. Improvements as in claim 5 including a washer and a lock washer between the nut on each bolt and the plate on each bolt.

9. A method of fastening integral, three-sided door frames to the side and top wall surfaces of a rectangular door opening, wherein the three elements (two side and one top) of the door frame to be fastened in the door opening have a cross sectional structure comprising, a pair of spaced apart, opposed, narrow, parallel flanges operative to lie flush against the wall surface of the door opening into which the frame is to be mounted, a pair of spaced apart, substantially parallel, opposed, inwardly extending (with respect to the door opening) panels, each panel connecting at one edge to one edge of one of said flanges and running substantially normal thereto, a pair of opposed, substantially parallel and spaced apart webs, each web connected at one edge to one edge of one of said panels and extending substantially normal thereto, and a C-section door stop member having its closed face inward of the door opening and one edge of each leg thereof connected to one edge of one of the webs and running substantially normal thereto, there being a plurality of spaced apart holes in the inward wall of the door stop member along the length thereof, comprising the steps of:

first drilling a plurality of holes into the said wall surfaces defining the door opening which will align with the inboard holes in the inward wall of the door stop member when the integral, three-sided frame is erected in the rectangular door opening, then erecting the said integral, three sided door frame into place within the door opening so that the outboard flanges of the door frame elements rest flush against the said door opening wall surfaces and the wall and door frame holes are in alignment with one another, driving a plurality of self-setting, externally threaded, elongate bolt members each into one of said wall openings through the respective, aligned door frame holes, each of said bolts being of a length greater than the depth of the frame element, there being a weakened portion of each bolt intermediate the ends thereof, whereby the inboard or inward portions of the bolts may be snapped off after the said bolts have been driven into the wall, so that they do not protrude inboard of the frame thereafter, each said bolt carrying adjacent the outboard end thereof, a rectangular, frame-outboard-flange-engaging plate, as well as a plate-retaining nut threaded on the adjacent externally threaded portion of the plate, the nut inboard of the plate and outboard of the weakened portion of the bolt, said bolts each driven into said door opening wall holes a sufficient depth that the nuts on the bolts, contacting the inboard sides of the plates on the bolts, drive the outboard sides of the plates, at the edges thereof, into contact with the frame flanges to hold them against the wall surfaces of the door openings, thereafter snapping off the inboard end of each of said bolts and tightening down each nut on each bolt against the inboard face of each said plate, whereby to firmly secure the door frame in the door opening against the wall surfaces which define the said door opening.

10. A method as in claim 9 including the step thereafter of permanently fixing the plates to the door frame elements.

11. A method as in claim 9 including the additional steps, in order to ensure the ability to remove the door frame from the door opening, of originally drilling each of the holes in the wall surface defining the door opening at least as deep as each bolt is long after the snap off of the inboard portion of the said bolt, then, after the frame has been mounted in the door opening and it is desired to remove same from the said door opening, removing the nuts from the inboard ends of the bolts, driving each of the bolts into the wall at least so far that the inboard end of each bolt is flush with the wall surface and thereafter removing the frame from the wall.

12. A method as in claim 9 including positioning a washer and a lock washer between the nut on each bolt and the plate on each bolt.

13. A method of fastening a door frame element to one of the side and top wall surfaces of a rectangular door opening, wherein the said element of the door frame to be fastened in the door opening has a cross-sectional structure comprising, a pair of spaced apart, opposed, narrow, parallel flanges operative to lie flush against the wall surface of the door opening into which the element is to be mounted, a pair of spaced apart, substantially parallel, opposed, inwardly extending (with respect to the door opening) panels, each panel connecting at one edge to one edge of one of said flanges and running substantially normal thereto, a pair of opposed, substantially parallel and spaced apart webs, each web connected at one edge to one edge of one of said panels and extending substantially normal thereto, and a C-section door stop member having its closed face inward of the door opening and one edge of each leg thereof connected to one edge of one of the webs and running substantially normal thereto, there being a plurality of spaced apart holes in the inward wall of the door stop member along the length thereof, comprising the steps of:

first drilling a plurality of holes into one of the wall surfaces defining the door opening which will align with the inboard holes in the inward wall of the door stop member when the frame element is inserted in the rectangular door opening against said surface, then inserting the said door frame element into place within the door opening so that the outboard flanges thereof rest flush against the said door opening wall surface and the wall and door frame holes are in alignment with one another, driving a plurality of self-setting, externally threaded, elongate bolt members each into one of said wall openings through the respective, aligned door frame element holes, each of said bolts being of a length greater than the depth of the frame element, there being a weakened portion of each bolt intermediate the ends thereof, whereby the inboard portions of the bolts may be snapped off after the said bolts have been driven into the wall, so that they do not protrude inboard of the frame element thereafter, each said bolt carrying adjacent the outboard end thereof, a rectangular, frame element outboard flange-engaging plate, as well as a plate-retaining nut threaded on the adjacent, externally threaded portion of the plate, the nut inboard of the plate and outboard of the weakened portion of the bolt, said bolts each driven into said door opening wall holes a sufficient depth that the nuts on the bolts, contacting the inboard sides of the plates on the bolts, drive the outboard sides of the plates, at the edges thereof, into contact with the frame element flanges to hold them against the said wall surface of the door opening, thereafter snapping off the inboard end of each of said bolts and tightening down each nut on each bolt against the inboard face of each said plate, whereby to firmly secure the door frame element in the door opening against the said wall surface defining part of the said door opening.

14. A method as in claim 13 including the step thereafter of permanently fixing the plates to the door frame element.

15. A method as in claim 13 including the additional steps, in order to ensure the ability to remove the door frame element from the wall surface of the door opening, of:

originally drilling each of the holes in the said wall surface receiving the door frame element at least as deep as each bolt is long after the snap-off of the inboard portion of the said bolt, then, after the frame element has been mounted in the door opening on the said wall surface and it is desired to remove same from the said door opening, removing the nuts from the inboard ends of the bolts, driving each of the bolts into the wall at least so far that the inboard end of each bolt is flush with the wall surface and thereafter removing the frame element from the wall surface.

16. A method as in claim 13 including positioning a washer and a lock washer between the nut on each bolt and the plate on each bolt.

* * * * *